United States Patent
El-Batal et al.

(10) Patent No.: US 7,983,125 B2
(45) Date of Patent: Jul. 19, 2011

(54) TABLE-DRIVEN POWER UTILIZATION METRICS

(75) Inventors: Mohamad El-Batal, Westminster, CO (US); Ray M. Jantz, Wichita, KS (US); Dennis T. Kleppen, Golden, CO (US)

(73) Assignee: LSI Corporation, Milpitas, CA (US)

( * ) Notice: Subject to any disclaimer, the term of this patent is extended or adjusted under 35 U.S.C. 154(b) by 429 days.

(21) Appl. No.: 12/259,137

(22) Filed: Oct. 27, 2008

(65) Prior Publication Data

US 2010/0103785 A1    Apr. 29, 2010

(51) Int. Cl.
*G11B 7/00* (2006.01)
*G06F 1/26* (2006.01)
(52) U.S. Cl. ........................ 369/47.5; 713/320
(58) Field of Classification Search ...... 369/47.5–47.52, 369/53.26, 116; 713/320, 340
See application file for complete search history.

(56) References Cited

U.S. PATENT DOCUMENTS

| | | | |
|---|---|---|---|
| 6,438,668 B1 * | 8/2002 | Esfahani et al. | 711/165 |
| 7,444,483 B2 * | 10/2008 | Taguchi et al. | 711/156 |
| 2007/0294552 A1 * | 12/2007 | Kakihara et al. | 713/320 |
| 2008/0198711 A1 * | 8/2008 | Bakx | 369/47.53 |
| 2009/0271645 A1 * | 10/2009 | Mori | 713/320 |
| 2009/0316541 A1 * | 12/2009 | Takada et al. | 369/47.5 |
| 2009/0319811 A1 * | 12/2009 | Kawakami | 713/320 |

* cited by examiner

Primary Examiner — Thang V Tran
(74) Attorney, Agent, or Firm — Samuel M. Freund; Cochran Freund & Young LLC

(57) ABSTRACT

An apparatus and method for determining the power consumption of one or more disk arrays are described. Power consumption information for various hardware components of the array, especially that for the disk drives since these consume more than 90% of the required power, are stored in a static data table in a database which may be controller firmware. Through inspection of this table and the chosen state of the individual disk drives as directed by a controller, one may determine the power use of the array.

17 Claims, 1 Drawing Sheet

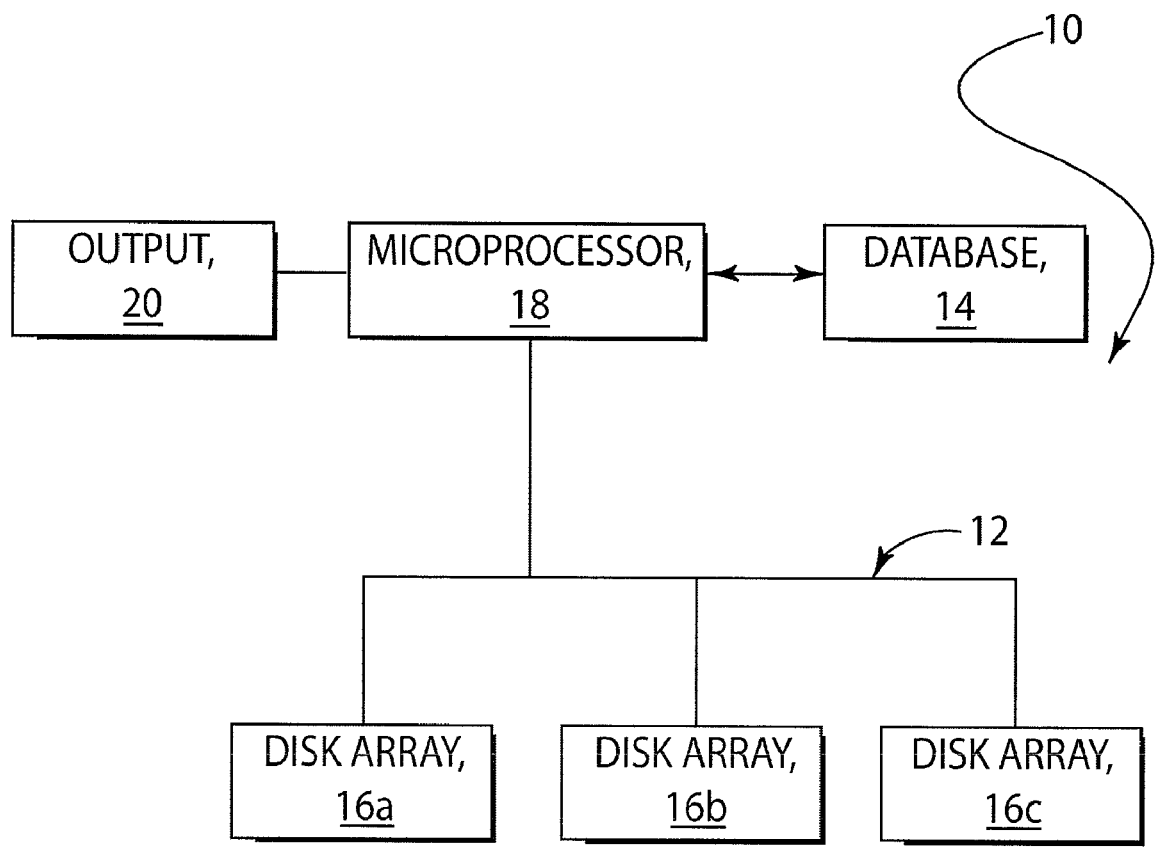
FIGURE

TABLE-DRIVEN POWER UTILIZATION METRICS

FIELD OF THE INVENTION

The present invention relates generally to disk-array storage subsystems and, more particularly, to apparatus and method for determining the power consumption of a disk array.

BACKGROUND OF THE INVENTION

It is known that disk drives consume in excess of 90% of the power needed by a storage array. With computer data storage systems becoming increasingly large, there is a need to monitor power consumption of disk array storage subsystems, and to receive feedback on the effectiveness of power-saving strategies available in the array management application. One approach is to design storage arrays around hardware having built-in capabilities for power monitoring and optimization. However, such hardware may add significant cost to the storage array and, since low-power considerations for storage arrays are relatively recent, such components may not be readily available.

Generally, the power consumption of disk drives under various conditions such as reading and writing, and idling, as examples, are known, and are readily available from the manufacturers thereof.

SUMMARY OF THE INVENTION

Accordingly, it is an object of the present invention to provide an apparatus and method for determining the power usage of a disk array storage system.

Another object of the invention is to provide an apparatus and method for determining the power usage of a disk array storage system, and for computing chosen power-related metrics.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects, and in accordance with the purposes of the present invention, as embodied and broadly described herein, the method for determining the power consumption of a disk array having at least one disk drive, hereof, includes the steps of: obtaining the power consumption value of the at least one disk drive under chosen operating conditions; storing the power consumption values in a database; selecting the operating conditions for each of the at least one disk drives; and determining the power consumption of the disk array by summing the power consumption values for the selected operating condition for each of the at least one disk drives in the disk array retrieved from the database.

In another aspect of the invention, and in accordance with its objects and purposes, the apparatus for determining the power consumption of a disk array having at least one disk drive, hereof, includes in combination: a database for storing the power consumption values of the at least one disk drive under chosen operating conditions; and a controller for selecting the operating conditions for each of the at least one disk drives and for summing the power consumption values for each of the at least one disk in the disk array retrieved from the database, whereby the power consumption of the disk array is determined.

In yet another aspect of the invention, and in accordance with its objects and purposes, the method for determining the power consumption of a disk array having at least one disk drive, hereof, includes the steps of: obtaining the power consumption value of the at least one disk drive under chosen operating conditions; storing the power consumption values in a database; monitoring the operating conditions for each of the at least one disk drives over a chosen time period; and determining the power consumption of the disk array by summing the power consumption values for the selected operating condition for each of the at least one disk drives in the disk array retrieved from the database.

In still another aspect of the invention, and in accordance with its objects and purposes, the apparatus for determining the power consumption of a disk array having at least one disk drive, hereof includes in combination: a database for storing the power consumption values of the at least one disk drive under chosen operating conditions; and a controller for monitoring the operating conditions for each of the at least one disk drives over a chosen time period and for summing the power consumption values for each of the at least one disk in the disk array retrieved from the database, whereby the power consumption of the disk array is determined.

In another aspect of the present invention, and in accordance with its objects and purposes, the method for determining the power consumption of a disk array having at least one disk drive, hereof, includes the steps of: measuring the power consumption value of the at least one disk drive under chosen operating conditions; storing the measured power consumption values in a database; monitoring the operating conditions for each of the at least one disk drives over a chosen time period; and determining the power consumption of the disk array by summing the power consumption values for the selected operating condition for each of the at least one disk drives in the disk array retrieved from the database.

Benefits and advantages of the present invention include, but are not limited to, providing power-consumption metrics which enable database administrators to determine the effects of exercising various power-saving measures such as spinning down inactive drives, as an example and providing early to market power-consumption reporting capabilities for storage array subsystems without requiring specialized hardware or hardware redesign.

BRIEF DESCRIPTION OF THE DRAWING

The accompanying drawing, which is incorporated in and forms a part of the specification, illustrates an embodiment of the present invention and, together with the description, serves to explain the principles of thereof.

The FIGURE is a schematic representation of one embodiment of an apparatus for determining the power usage in a disk array system.

DETAILED DESCRIPTION OF THE INVENTION

Briefly, the present invention includes an apparatus and method for using static data tables in array controller firmware, or other database, for providing power consumption ratings of the various hardware components included in the array, especially those for the disk drives. By inspecting such tables, a controller firmware can determine the power usage associated with different components in various states of operation; for example, a drive spun up versus a drive at idle.

Further, combining such information with known statistical information for arrays such as input/output per second or gigabytes per second as a function of power consumed, various power-related metrics can be computed and displayed.

Typically, power consumption values may be obtained from the drive manufacturers. However, the manufacturers may provide only "nominal" and "maximum" numbers. More accurate values may be obtained by direct measurement of the power consumption under the conditions of interest under conditions such as spun-down, spun-up-idle or spun-up-active, as examples for individual drives. In order to make full use of this information, a controller or microprocessor would have to keep track of a drive's operating conditions as a function of time.

Power-related metrics may include: (1) power consumed per unit of provisioned capacity; (2) power consumed per unit of unprovisioned capacity; and (3) power consumed per unit of transfer rate, or bandwidth. These metrics can also be provided at different scope levels; for example, the array level, the storage pool level, and at the volume level.

Raw power usage as a function of time may also be presented by following the operating conditions of the drives at chosen time periods.

Reference will now be made in detail to the present embodiments of the invention, examples of which are illustrated in the accompanying drawings. Turning now to the FIGURE, a schematic representation of one embodiment of apparatus, 10, for determining the power usage in disk array system, 12, is illustrated. Database, 14, includes data relating to the power usage of the disk drives in disk arrays, 16a-16c, of disk array system 12 for various operating conditions of the disk drives such as one or more drives being spun up, one or more drives being at idle, one or more drives being spun down, one or more drives transferring data at a chosen rate, and one or more drive transferring data at a maximum rate, as examples. As stated, hereinabove, some information is available from the manufacturers of the individual disk drives, or may be directly measured for particular units.

Microprocessor (controller), 18, may select the operation parameters for the various disk drives in disk array system 12 in accordance with the function of the disk array system and power-saving measures suitable for a particular array management application. Power use information for each disk drive involved may be read from database 14, and power consumption of each array (16a-16c) and for system 12 may be determined from this information and the chosen operating parameters of the individual disks. Feedback on the effect of these power-saving measures may be output from microprocessor 18 onto output 20, which may include a printer or a tabular output on a monitor, as examples. Database 14 may be firmware associated with microprocessor 18.

Chosen operating conditions for at least one disk drive include the at least one drive being spun up, the at least one drive being at idle, the at least one drive being spun down, the at least one drive transferring data at a chosen rate, and the at least one drive transferring data at a maximum rate, as examples. As a trivial example, power-saving measures might include spinning down inactive drives.

Rates of data transfer into and out of an array may be measured from which power-related metrics including power consumed per unit of provisioned capacity, power consumed per unit of unprovisioned capacity, and power consumed per unit of transfer rate, as examples may be calculated.

Having generally described embodiments of the invention, the following EXAMPLE provides additional details:

EXAMPLE

As an example, the controller or microprocessor may have a static power data table in memory providing three numbers for each drive in the array: (1) power consumed when the drive is spun down; (2) power consumed when the drive is spun up, but idle; and (3) power consumed when the drive is spun up and active, where active means a drive engaged in performing I/O, that is, either seeking or transferring data. Note that the drives may not be identical. Further, assuming that the controller samples the following at regular time intervals (for example, every 5 s): (1) the number of drives spun down, by drive type; (2) the number of drives spun up, but idle, by drive type; and (3) the number of drives spun-up, but active, by drive type, the controller may then generate a table giving the power utilization of the aggregate of all the disks at each 5 s interval. A display tool may transform this table into a graph for improved user comprehension. Such a table/graph might also be generated by drive type.

Additionally, the controller may track overall array performance by IOs/s and/or gigabytes/s. From such data, the intervals of peak performance may be determined. Using the generated static power data table, the power usage over these intervals may be averaged and used to compute IOs (or gigabytes) per second per watt.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for determining the power consumption of a disk array having at least one disk drive, comprising the steps of:
   obtaining the power consumption value of the at least one disk drive under chosen operating conditions;
   storing the power consumption values in a database;
   selecting the operating conditions for each of the at least one disk drive; and
   determining the power consumption of the disk array by summing the power consumption values for the selected operating condition for each of the at least one disk drive in the disk array retrieved from the database.

2. The method of claim 1, further including the step of outputting the power consumption of the disk array.

3. The method of claim 1, wherein said step of obtaining the power consumption value of the at least one disk drive comprises directly measuring the power consumption of the at least one disk drive under chosen operating conditions.

4. The method of claim 1, further comprising the step of measuring rates of data transfer into and out of the array from which power-related metrics selected from the group consisting of: power consumed per unit of provisioned capacity, power consumed per unit of unprovisioned capacity, and power consumed per unit of transfer rate, are calculated.

5. An apparatus for determining the power consumption of a disk array having at least one disk drive, comprising in combination:
   a database for storing the power consumption values of said at least one disk drive under chosen operating conditions;
   a controller for selecting the operating conditions for each of said at least one disk drive; and means for summing the power consumption values for each of said at least one disk drive in said disk array retrieved from said database, whereby the power consumption of said disk array is determined.

6. The apparatus of claim 5, further comprising means for outputting the power consumption of said disk array.

7. The apparatus of claim 5, further comprising means for measuring rates of data transfer into and out of said array from which power-related metrics selected from the group consisting of power consumed per unit of provisioned capacity, power consumed per unit of unprovisioned capacity, and power consumed per unit of transfer rate, are calculated.

8. A method for determining the power consumption of a disk array having at least one disk drive, comprising the steps of:
    obtaining the power consumption value of the at least one disk drive under chosen operating conditions;
    storing the power consumption values in a database;
    monitoring the operating conditions for each of the at least one disk drive over a chosen time period; and
    determining the power consumption of the disk array by summing the power consumption values for the selected operating condition for each of the at least one disk drive in the disk array retrieved from the database.

9. The method of claim 8, further including the step of outputting the power consumption of the disk array.

10. The method of claim 8, wherein said step of obtaining the power consumption value of the at least one disk drive comprises directly measuring the power consumption of the at least one disk drive under chosen operating conditions.

11. The method of claim 8, further comprising the step of measuring rates of data transfer into and out of the array from which power-related metrics selected from the group consisting of: power consumed per unit of provisioned capacity, power consumed per unit of unprovisioned capacity, and power consumed per unit of transfer rate, are calculated.

12. An apparatus for determining the power consumption of a disk array having at least one disk drive, comprising in combination:

a database for storing the power consumption values of said at least one disk drive under chosen operating conditions; and
    a controller for monitoring the operating conditions for each of said at least one disk drive over a chosen time period and for adding the power consumption values for each of said at least one disk drive in the disk array retrieved from the database, whereby the power consumption of said disk array is determined.

13. The apparatus of claim 12, further comprising means for outputting the power consumption of said disk array.

14. The apparatus of claim 12, further comprising means for measuring rates of data transfer into and out of said array from which power-related metrics selected from the group consisting of power consumed per unit of provisioned capacity, power consumed per unit of unprovisioned capacity, and power consumed per unit of transfer rate, are calculated.

15. A method for determining the power consumption of a disk array having at least one disk drive, comprising the steps of:
    measuring the power consumption value of the at least one disk drive under chosen operating conditions;
    storing the measured power consumption values in a database;
    monitoring the operating conditions for each of the at least one disk drive over a chosen time period; and
    determining the power consumption of the disk array by summing the power consumption values for the selected operating condition for each of the at least one disk drive in the disk array retrieved from the database.

16. The method of claim 15, further including the step of outputting the power consumption of the disk array.

17. The method of claim 15, further comprising the step of measuring rates of data transfer into and out of the array from which power-related metrics selected from the group consisting of: power consumed per unit of provisioned capacity, power consumed per unit of unprovisioned capacity, and power consumed per unit of transfer rate, are calculated.

* * * * *